United States Patent
Oikawa (10) Patent No.: US 10,632,972 B2
(45) Date of Patent: Apr. 28, 2020

(54) VEHICLE WIPER CONTROL DEVICE

(71) Applicant: TOYOTA JIDOSHA KABUSHIKI KAISHA, Toyota-shi, Aichi (JP)

(72) Inventor: Yoshitaka Oikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 279 days.

(21) Appl. No.: 15/642,916

(22) Filed: Jul. 6, 2017

(65) Prior Publication Data
US 2018/0099645 A1  Apr. 12, 2018

(30) Foreign Application Priority Data
Oct. 6, 2016 (JP) .................... 2016-197700

(51) Int. Cl.
*B60S 1/08* (2006.01)
*B60N 2/00* (2006.01)

(52) U.S. Cl.
CPC ............ *B60S 1/0833* (2013.01); *B60N 2/002* (2013.01); *B60S 1/0818* (2013.01); *B60S 1/0844* (2013.01); *B60S 1/0896* (2013.01)

(58) Field of Classification Search
CPC .... B60S 1/0833; B60S 1/0818; B60S 1/0844; B60S 1/0896; B60N 2/002
See application file for complete search history.

(56) References Cited

U.S. PATENT DOCUMENTS 4,588,935 A * 5/1986 Kaneiwa ............... B60S 1/0818
                                                       318/443
6,072,295 A * 6/2000 Kusunoki ................ B60S 1/08
                                                       318/444

(Continued)

FOREIGN PATENT DOCUMENTS

JP        H10-111249 A      4/1998
JP        2782343 B2        7/1998

(Continued)

OTHER PUBLICATIONS

Oct. 23, 2018 Office Action issued in Japanese Patent Application No. 2016-197700.

(Continued)

*Primary Examiner* — Thomas E Worden
(74) *Attorney, Agent, or Firm* — Oliff PLC (57) ABSTRACT

Automatic wiper control prohibiting means prohibits execution of automatic wiper control when vehicle stop detecting means detects that a vehicle is stopping and a masking object detecting part determines that a masking object is adhered to an outer surface of a window part. When the vehicle stop detecting means detects that the vehicle is stopping and a state of the masking object detecting part is changed from a state where the masking object detecting part detects that the masking object is adhered to the outer surface of the window part to a state where the masking object detecting part detects that the masking object is not adhered to the outer surface of the window part at a changing time, the automatic wiper control prohibiting means prohibits the execution of said automatic wiper control for a predetermined period of time from the changing time.

3 Claims, 6 Drawing Sheets

(56) References Cited

U.S. PATENT DOCUMENTS

| | | | |
|---|---|---|---|
| 2010/0208060 A1* | 8/2010 | Kobayashi | B60S 1/0844 348/135 |
| 2010/0295450 A1* | 11/2010 | Oishi | B60Q 1/143 315/77 |
| 2013/0345931 A1* | 12/2013 | Petridis | B60S 1/0822 701/36 |
| 2017/0174182 A1* | 6/2017 | Park | B60S 1/0833 |
| 2017/0364629 A1* | 12/2017 | Tarte | B60N 2/002 |

FOREIGN PATENT DOCUMENTS

| | | | |
|---|---|---|---|
| JP | 2000-038114 A | 2/2000 |
| JP | 2000-264122 A | 9/2000 |
| JP | 2000-313315 A | 11/2000 |
| JP | 2012-150014 A | 8/2012 |

OTHER PUBLICATIONS

Apr. 24, 2019 Decision to Grant a Patent issued in Japanese Patent Application No. 2016-197700.

* cited by examiner

VEHICLE WIPER CONTROL DEVICE

BACKGROUND OF THE INVENTION

1. Field of the Invention

The present invention relates to a vehicle wiper control device that automatically activates a wiper when, for example, raindrops adhere to an outer surface of a window part of a vehicle.

2. Description of the Related Art

Typically, a vehicle is provided with a wiper that is reciprocated by the power of an actuator. As is well known, the wiper reciprocally swings on the outer surface of a front window, which is made of a translucent material and a part of the vehicle, about a predetermined rotation axis to remove raindrops (moisture) adhered to the outer surface of the front window.

The actuator is controlled by a control device.

The control device can control the actuator in any one of a manual control mode and an automatic wiper control mode. An occupant of the vehicle can select the manual control mode or the automatic wiper control mode as a control mode, for example, by operating a mode changeover switch provided on an instrumental panel.

When, for example, a wiper switch provided on the instrument panel is OFF under a state where the manual control mode is selected by the mode changeover switch, the actuator does not operate. On the other hand, when the wiper switch is switched to ON under this state, the actuator operates to reciprocate the wiper on the outer surface of the front window.

On the other hand, when the automatic wiper control mode is selected by the mode changeover switch, the actuator is switched between a stop state and an operation state according to a detection result of a well-known rain sensor provided in the vehicle.

The rain sensor is provided so as to face the inner surface of the front window. The rain sensor emits a light wave (electromagnetic wave) toward the outside of the vehicle. Then, the light wave passes through the front window and move toward the outside of the front window. When the light wave is reflected by an obstacle located outside the front window, the reflected light passes through the front window and is received by the rain sensor. When receiving the reflected light, the rain sensor detects an intersection angle (reflection angle) between the emitted light and the reflected light. By the way, the magnitude of this intersection angle is determined by the type (surface shape) of the obstacle. In other words, the type of the obstacle can be substantially specified on the basis of the magnitude of the intersection angle. The control device, which is connected to the rain sensor, determines whether or not the obstacle is raindrop (moisture) based on the intersection angle information detected by the rain sensor.

When determining that "the obstacle is not a raindrop", the control device does not activate the actuator. Namely, the wiper is maintained in a stopped state.

On the other hand, when determining that "the obstacle is a raindrop", the control device actuates the actuator to reciprocate the wiper.

It should be noted that Japanese Unexamined Patent Application Publication No. H10-111249 discloses a background technology related to the present invention.

SUMMARY OF THE INVENTION

In recent years, vehicles equipped with a pre-crash safety system (hereinafter referred to as "PCS") have been widespread.

The PCS includes a camera for imaging an object (for example, another vehicle or a pedestrian located in front of the vehicle) around the vehicle, a distance measuring means for measuring a distance to the object, and a brake control device for controlling a brake device based on the detection results of the camera and the distance measuring means.

The camera is provided so as to face the inner surface of the front window. The reflected light flux (object image) reflected backward by the object is imaged by an image pickup device of the camera after passing through the front window. The brake control device determines the type of the object (vehicle, pedestrian, etc.) based on the imaging data received from the camera.

For example, the distance measuring means emits infrared light toward the object and receives infrared light reflected backward by the object. The brake control device calculates the distance from the vehicle to the object based on the information received from the distance measuring means.

The brake control device activates the brake device of the vehicle when, for example, the object imaged by the camera is a vehicle and/or a pedestrian and the distance from the vehicle to the object is shorter than a preset predetermined distance.

By the way, when an opaque masking object (for example, mud etc.) is adhered to the outer surface of the front window and is located just in front of the camera, the camera cannot image the object. Thus, even when, for example, another vehicle is positioned in front of the vehicle and the distance therebetween is shorter than the predetermined distance, the brake control device cannot activate the brake device.

When such a situation occurs, an occupant of a vehicle typically gets out of the vehicle after stopping the vehicle, and then removes the masking object adhered to the outer surface of the front window by using, for example, a cleaning tool (for example, a cloth or the like) gripped by his/her hand.

By the way, when the control mode of the wiper is the automatic wiper control mode and rain falls, the actuator is operated to reciprocate the wiper. Thus, the occupant, who has gotten out of the vehicle, may have difficulty in removing the masking object by the cleaning tool due to this reciprocating movement of the wiper.

Further, when the occupant, who has gotten out of the vehicle, tries to remove the masking object by the cleaning tool, the light wave emitted from the rain sensor may be reflected by his/her hand and/or the cleaning tool and may be received by the rain sensor. This occurs when the control mode of the wiper is the automatic wiper control mode and rain does not falls.

As described above, the intersection angle (reflection angle) between the emitted light and the reflected light when the light wave is reflected by the obstacle differs depending on the type of the obstacle. However, if the cleaning tool and/or the hand has a predetermined surface shape, the intersection angle when the light wave is reflected by the predetermined surface shape may be similar to the intersection angle when the light wave is reflected by a raindrop. In this case, there is a possibility that the control device erroneously determines that the hand and/or the cleaning tool is a raindrop. Namely, there is a fear that the actuator erroneously operates to reciprocate the wiper.

Thus, also in this case, the occupant, who has gotten out of the vehicle, may have difficulty in removing the masking object by the cleaning tool due to the reciprocating movement of the wiper.

In this case, when the occupant is positioned inside the vehicle, the wiper is not swinging. Thus, in this case, the occupant is highly unlikely to expect that he/she will have difficulty in removing the masking object by the cleaning tool due to the reciprocating movement of the wiper. Thus, in this case, the occupant is easier to have difficulty in removing the masking object by the cleaning tool due to the wiper compared with the case where rain falls.

When the wiper moves just in front of the camera, the camera is prevented from imaging the object at a predetermined time intervals by the reciprocation movement of the wiper. In other words, the camera cannot continuously image the object. Thus, typically, the camera is disposed at a position different from the position immediately behind the movement range of the wiper.

Therefore, in general, when a masking object located immediately in front of the camera adheres to the outer surface of the front window, the wiper fails to remove this masking object.

The present invention has been made to cope with the above problems. Namely, the present invention has an object to provide a vehicle wiper control device that does not makes it difficult for an occupant positioned outside a vehicle to remove a masking object due to a movement of a wiper when the masking object adhered to the outer surface of a window part is detected by a masking object detecting sensor during execution of an automatic wiper control.

In order to achieve the object, an vehicle wiper control device (10) comprises:

an actuator (32) for generating a driving force to move a wiper (30A, 30B) capable of reciprocating while contacting with an outer surface of a window part that is made of a translucent material and a part of a vehicle;

a rain sensor (35), provided so as to face an inner surface of the window part, for emitting a light wave so as to pass through the window part and detecting an obstacle by receiving the light wave reflected by the obstacle located outside the window part;

actuator control means (15) capable of executing automatic wiper control that automatically activates the actuator when the obstacle detected by the rain sensor is a specific obstacle that is one of moisture and a predetermined object other than the moisture;

vehicle stop detecting means (17, 18) for detecting that the vehicle is stopping running;

a masking object detecting part (21, 40) including a masking object sensor (21) that is separated from the rain sensor and acquires a signal for detecting whether or not a masking object is adhered to the outer surface of the window part, the masking object detecting part determining whether or not the masking object is adhered to the outer surface of the window part based on the signal; and automatic wiper control prohibiting means (15) that prohibits execution of the automatic wiper control when the vehicle stop detecting means detects that the vehicle is stopping and the masking object detecting part determines that the masking object is adhered to the outer surface of the window part.

When the vehicle stop detecting means detects that the vehicle is stopping and a state of the masking object detecting part is changed from a state where the masking object detecting part detects that the masking object is adhered to the outer surface of the window part to a state where the masking object detecting part detects that the masking object is not adhered to the outer surface of the window part at a changing time, the automatic wiper control prohibiting means prohibits the execution of the automatic wiper control for a predetermined period of time from the changing time.

The actuator control means of the present invention can execute the automatic wiper control that automatically activates the actuator when the obstacle detected by the rain sensor is the specific obstacle which includes moisture and the predetermined object other than moisture.

However, the actuator control means may be prevented from executing the automatic wiper control by the automatic wiper control prohibiting means, even when the rain sensor detects the specific obstacle, for example moisture. This occurs when a predetermined prohibition condition is met.

Namely, the automatic wiper control prohibiting means prevents the actuator control means from executing the automatic wiper control when the vehicle stop detecting means detects that the vehicle is stopping and the masking object detecting part determines that the masking object is adhered to the outer surface of the window part. In other words, the actuator control means does not move the wiper.

Therefore, even when the rain sensor detects moisture (the specific obstacle), the wiper does not move. Thus, the occupant, who has gotten out of the vehicle, has no difficulty in removing the masking object due to the movement of the wiper.

When the occupant removes the masking object by his/her hand and/or the cleaning tool and rain does not fall, the rain sensor may determine that his/her hand and/or the cleaning tool is the specific obstacle.

However, also in this case, the wiper does not move. Thus, the occupant, who has gotten out of the vehicle, has no difficulty in removing the masking object due to the movement of the wiper.

when the vehicle stop detecting means detects that the vehicle is stopping and the state of the masking object detecting part is changed from the state where the masking object detecting part is detecting that the masking object is adhered to the outer surface of the window part to the state where the masking object detecting part is detecting that the masking object is not adhered to the outer surface of the window part at the changing time, the automatic wiper control prohibiting means prohibits the actuator control means from executing the automatic wiper control for the predetermined period of time from the changing time. In other words, when the detection of the masking object has finished due to removal of the masking object, which was on the outer surface of the window part, the wiper does not start moving as soon as the detection of the masking object has finished.

The occupant's hand and/or the cleaning tool may be positioned around the outer surface of the window part immediately after the masking object is removed from the window part by the occupant. Thus, when the wiper start moving as soon as the masking object is removed under this situation, the occupant may have difficulty in his/her operation.

However, in the present invention, the actuator and the wiper do not operate for the predetermined period of time from the changing time when the state of the masking object detecting part is changed to the state where the masking object detecting part detects that the masking object is not adhered to the outer surface of the window part. Therefore, the occupant is unlikely to have difficulty in his/her operation due to the movement of the wiper.

In one of aspects of the present invention, an occupant detection sensor (50, 51, 55, 56) for detecting whether or not an occupant is seated in each of a driver seat and a passenger seat of the vehicle may be provided. The automatic wiper control prohibiting means may be configured to prohibit the execution of the automatic wiper control only when the occupant detection sensor detects that no occupant is seated in at least one of the driver seat and the passenger seat of the vehicle.

In one of aspects of the present invention, an occupant detection sensor (50, 51, 55, 56) for detecting whether or not an occupant is seated in each of a driver seat and a passenger seat of the vehicle may be provided. The automatic wiper control prohibiting means may be configured to prohibit the execution of the automatic wiper control only when the occupant detection sensor detects that no occupants are seated in both the driver seat and the passenger seat of the vehicle.

In the case where the present invention is executed in these manners, the automatic wiper control prohibiting means prevents the actuator control means from executing the automatic wiper control, only when no occupant is seated in at least one of the driver seat and the passenger seat of the vehicle or only when no occupants are seated in both the driver seat and the passenger seat of the vehicle.

When no occupant is seated in at least one of the driver seat and the passenger seat of the vehicle and when no occupants are seated in both the driver seat and the passenger seat of the vehicle, it can be assumed that the occupant(s) of the vehicle is(are) positioned outside the vehicle. Namely, it can be assumed that the occupant(s) is (are) highly likely to remove the masking object on the window part.

Therefore, the actuator control means is prohibited from executing the automatic wiper control only when it can be assumed that the occupant(s) is (are) highly likely to remove the masking object on the window part. In other words, in the case where it can be assumed that the occupant(s) is (are) highly unlikely to remove the masking object on the window part, the actuator control means, which is executing the automatic wiper control, does not stop the actuator when the rain sensor is detecting the specific obstacle.

Therefore, the actuator control means, which is executing the automatic wiper control, does not stop the actuator when there is no need to stop the movement of the wiper.

In the above description, references used in the following descriptions regarding embodiments are added with parentheses to the elements of the present invention, in order to understand the invention. However, those references should not be used to limit the scope of the present invention.

Other objects, other features, and accompanying advantages of the present invention are easily understood from the description of embodiments of the present invention to be given referring to the following drawings.

DETAILED DESCRIPTION OF THE PREFERRED EMBODIMENTS

A vehicle wiper control device 10 and a vehicle on which the vehicle wiper control device 10 is mounted according to an embodiment of the present invention will be described hereinafter with reference to the attached drawings.

The vehicle on which the wiper control device 10 is mounted is provided with a vehicle body, four wheels, an internal combustion engine, a stepped automatic transmission capable of changing automatically its gear stages step by step, a torque converter connected to the internal combustion engine and the stepped automatic transmission, and a brake device capable of exerting a braking force on each of the wheels, all of which are not shown.

The power generated by the internal combustion engine is transmitted to the stepped automatic transmission via the torque converter and is further transmitted from the stepped automatic transmission to each of wheels (drive wheels) via a drive shaft and the like. Namely, this vehicle is an automatic transmission vehicle (AT automobile).

A shift lever (not shown) is provided inside the vehicle. The shift lever is movable to six shift positions: D (drive) range, L (first speed) range, 2 (2nd speed) range, R (reverse) range, P (parking) range and N (neutral) range.

Figure 2:
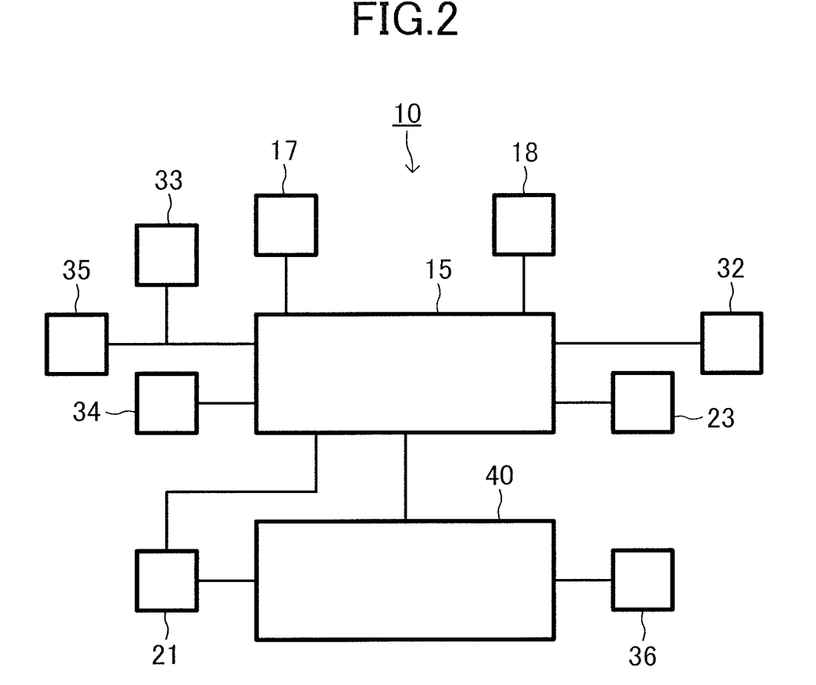
FIG. 2 is a control block diagram of the vehicle wiper control device according to the embodiment of the present invention.

In addition, the vehicle is provided with a shift lever position switch 17 shown in FIG. 2. The shift lever position switch 17 is connected to a body ECU 15. The shift lever position switch 17 detects the shift position of the shift lever and transmits the shift position signal indicating the detection result to the body ECU 15. The ECU is an abbreviation of an electric control unit and is an electronic control circuit having a microcomputer which includes a CPU, a ROM, a RAM, an interface and the like as its main components. The CPU realizes various functions to be described later by executing instructions stored in a memory (ROM).

Upon receiving the shift position signal from the shift lever position switch 17, the body ECU 15 transmits a control signal to electromagnetic switching valves of an oil-hydraulic circuit (not shown). As a result, the path of hydraulic fluid flowing through the oil-hydraulic circuit changes and then the stepped automatic transmission, which receives oil pressure of hydraulic fluid, automatically changes its gear stage (gear). As is well known, when the shift position is the L range, the gear stage of the stepped automatic transmission is 1st gear, and when the shift position is the 2 range, the gear stage of the stepped automatic transmission is 2nd gear. When the shift position is the R range, the gear stage of the stepped automatic transmission is back gear. When the shift position is the N range, the stepped automatic transmission is in a neutral state, and when the shift position is the P range, the stepped automatic transmission is in a parking state.

In addition, the vehicle is provided with a brake actuator which is not shown and is used for operating the brake device. This brake actuator interlocks with the brake pedal provided inside the vehicle. In addition, the brake actuator is connected to the body ECU 15. When a driver depresses the brake pedal with his/her foot, the body ECU 15 sends a brake signal to the brake actuator so that the brake actuator is operated. Then, the brake actuator activates each of the brake devices so that each brake device gives a braking force to corresponding one of the wheels.

Figure 1:
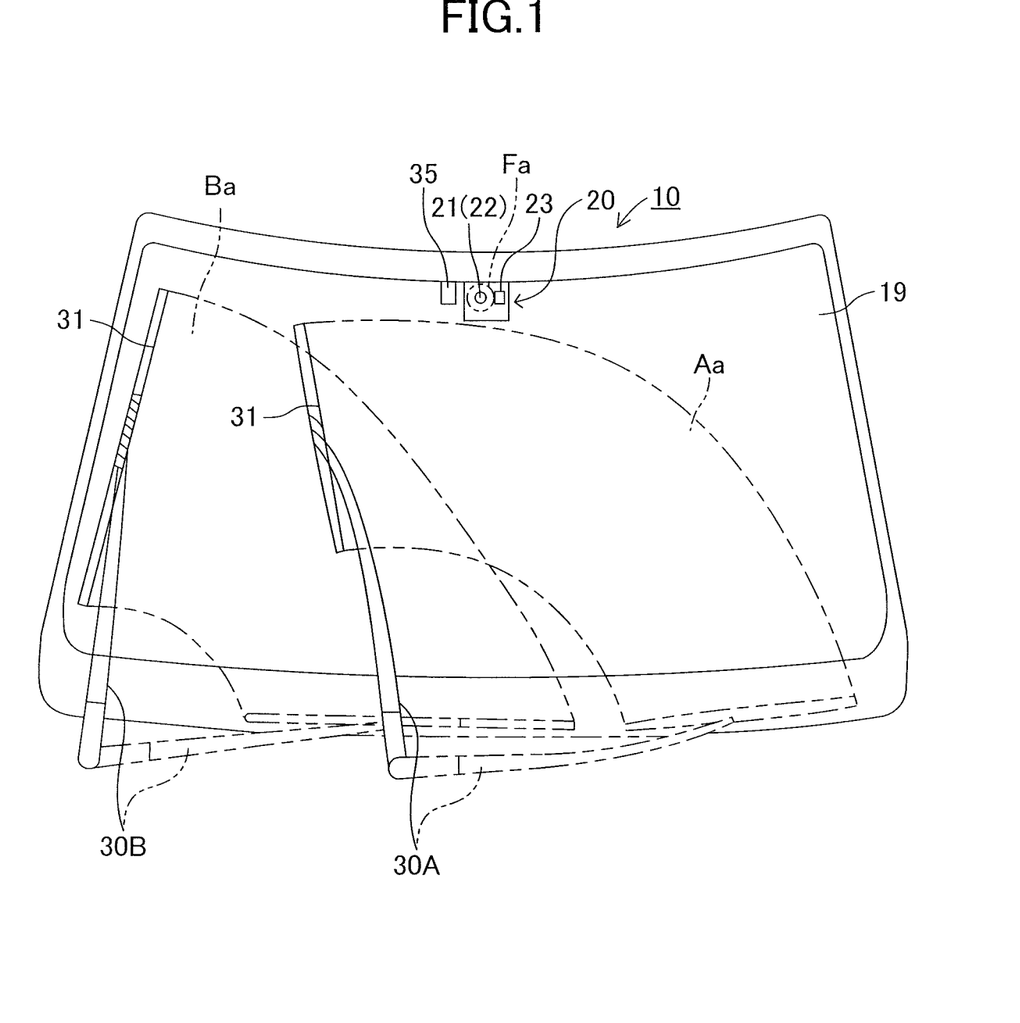
FIG. 1 is a front view of a vehicle wiper control device and a front window according to an embodiment of the present invention.

Furthermore, a front window 19 (a window part) shown in FIG. 1 is fixed to the vehicle body. The front window 19 is made of translucent material (eg, glass, resin, etc.).

As shown in FIG. 2, the vehicle has a vehicle speed sensor 18 that is connected to the body ECU 15 and detects the vehicle speed.

As shown in FIG. 1, the vehicle has an optical unit 20 including a camera 21 and a distance measuring means 23. The optical unit 20 is disposed just behind the upper part of the front window 19. In other words, the optical unit 20 is disposed inside the vehicle. Namely, the optical unit 20 faces the inner surface (rear surface) of the upper part of the front window 19. As shown in FIG. 2, the camera 21 and the distance measuring means 23 are connected to the body ECU 15.

The camera 21 is provided with a fixed lens 22 and an image pickup device that is not shown and is positioned immediately behind the fixed lens 22. The image pickup device of the camera 21 receives the photographing light flux. This photographing light flux is a natural light that is reflected backward by an obstacle located in front of the front window 19 and passes through the front window 19 and the fixed lens 22. The size (sectional shape) of the photographing light flux received by the image pickup device is determined by the angle of view of the fixed lens 22. In the present embodiment, as shown in FIG. 1, a camera anterior area Fa is formed at a portion that is located on the outer surface of the front window 19 and is positioned just before the camera 21. The photographing light flux passes through the camera anterior area Fa.

The distance measuring means 23 is provided with an infrared light emission part and an infrared light receiving part. The infrared light emission part emits infrared light forward. The infrared light receiving part has a PSD (position sensitive detector) that is a well-known light receiving element. The PSD of the infrared light receiving part receives infrared light that is emitted forward from the infrared light emission part and is reflected backward by an obstacle located in front of the front window 19. As is well known, when the distance from the obstacle reflecting the infrared light to the infrared light receiving part changes, the light receiving position of the infrared light on the light receiving surface of the PSD changes.

The body ECU 15, the camera 21, the distance measuring means 23 and the brake actuator are components of the PCS.

When a predetermined condition is met under the state where the vehicle is running forward with the internal combustion engine started and the shift lever positioned, for example, at the D range, the PCS activates each of the brake devices.

Namely, when the camera 21 images an object (an obstacle) located in front of the vehicle and the distance measuring means 23 receives an infrared light reflected by this object, the body ECU 15 may determines that "the object(s) is (are) a vehicle and/or a pedestrian and the distance(s) from the vehicle (the optical unit 20) to the object(s) is (are) shorter than a preset predetermined distance". When determining so, the body ECU 15 sends a brake signal to the brake actuator. Then, each brake device is operated, so that the vehicle speed of the vehicle is lowered.

Next, the wiper control device 10 will be described.

The wiper control device 10 is provided with the body ECU 15, the shift lever position switch 17, the vehicle speed sensor 18, and the optical unit 20, all of which are described above. Furthermore, the wiper control device 10 is provided with an actuator 32 for operating wipers 30A, 30B, a mode changeover switch 33, a wiper switch 34, a rain sensor 35, a display 36 and a masking determination ECU 40, all of which will be described hereinafter.

The display 36 shown in FIG. 2 is provided on an instrumental panel of the vehicle body. The display 36 is connected to the masking determination ECU 40. The display 36 of the present embodiment is a liquid crystal display.

Furthermore, the body ECU 15 and the camera 21 are connected to the masking determination ECU 40.

By the way, if an opaque masking object (such as mud) is adhered (attached) to the camera anterior area Fa of the front window 19, the camera 21 cannot image an object located in front of the front window 19. Thus, the PCS cannot operate the brake device, even when, for example, another vehicle (an object) is located in front of the vehicle and the distance between the vehicle having the wiper control device 10 and another vehicle described above is shorter than the predetermined distance.

Thus, when the masking determination ECU 40 determines that "an opaque masking object is adhered to the camera anterior area Fa of the front window 19" based on the imaging data transmitted from the camera 21, the masking determination ECU 40 makes the display 36 show a warning indication: for example "a masking object is adhered to the front window".

The occupant of the vehicle, who saw this warning indication, gets out of the vehicle after stopping the vehicle to remove the masking object adhered to the camera anterior area Fa with using, for example, a cleaning tool (e.g., a cloth) gripped by his/her hand.

When the masking determination ECU 40 determines that "no opaque masking object is adhered to the camera anterior area Fa" based on the imaging data transmitted from the camera 21 after the masking object is removed from the camera anterior area Fa, the display 36 does not show the warning indication.

When the brightness of the image data (image) transmitted from the camera 21 is equal to or less than a predetermined value and this state continues for equal to or more than a predetermined time, the masking determination ECU 40 determines that "an opaque masking object is adhered to the camera anterior area Fa of the front window 19". The signal that is outputted by the masking determination ECU 40 and is sent to the body ECU 15 at this time may be referred to as "a detection signal" hereinafter.

On the other hand, when the brightness of the image data transmitted from the camera 21 is higher than the predetermined value and/or when a s state where the brightness is equal to or less than the predetermined value continues for a period of time shorter than the predetermined time, the masking determination ECU 40 determines that "no opaque masking object is adhered to the camera anterior area Fa of the front window 19". The signal that is outputted by the masking determination ECU 40 and is sent to the body ECU 15 at this time may be referred to as "a non-detection signal" hereinafter.

As shown in FIG. 1, two wipers 30A and 30B are provided in the vehicle body.

The base ends of the wipers 30A and 30B are supported by two rotating shafts fixed to the vehicle body so as to be swingable, respectively. Each of the wipers 30A, 30B has a sliding part 31 that contacts with the outer surface (the front surface) of the front window 19. Each of the wipers 30A and 30B can swing between the initial position indicated by a two-dot chain line and the limit position indicated by a solid line.

Further, as shown in FIG. 2, the vehicle is provided with the actuator 32 connected to the body ECU 15. The actuator 32 is constituted by, for example, an electric motor. The actuator 32 and the wipers 30A, 30B are connected to each other via a power transmission mechanism (not shown).

Further, the mode changeover switch 33 and the wiper switch 34, both of which control the operation of the actuator 32, are connected to the body ECU 15. The mode changeover switch 33 and the wiper switch 34 are provided, for example, on the instrumental panel of the vehicle body.

The mode changeover switch 33 can switch the control mode of the actuator 32 performed by the body ECU 15 between a manual control mode and an automatic wiper control mode.

For example, when the manual control mode is selected by the mode changeover switch 33 under a state where the wiper switch 34 is OFF, the body ECU 15 does not activate the actuator 32. Namely, the body ECU 15 does not swing the wipers 30A, 30B.

On the other hand, when the manual control mode is selected and the wiper switch 34 is turned ON, the body ECU 15 repeatedly rotates the actuator 32 in the forward direction and the reverse direction at a constant interval. Then, the driving force of the actuator 32 is transmitted to the wipers 30A and 30B via the power transmission mechanism so that the wipers 30A and 30B reciprocally swing between the initial position and the limit position. As shown in FIG. 1, when the wiper 30A swings between the initial position and the limit position, the sliding part 31 of the wiper 30A slides on a sliding area Aa that is part of the outer surface of the front window 19. Similarly, when the wiper 30B swings between the initial position and the limit position, the sliding part 31 of the wiper 30B slides on a sliding area Ba that is part of the outer surface of the front window 19. Namely, when each of the wipers 30A, 30B swings between the initial position and the limit position, foreign materials (for example, raindrops) adhered to the sliding area Aa and the sliding area Ba of the front window 19 are removed by each sliding part 31. As shown in FIG. 1, the camera anterior area Fa is located outside the sliding area Aa and the sliding area Ba.

The operation of the wipers 30A and 30B when the automatic wiper control mode is selected by the mode changeover switch 33 will be described later.

As shown in FIGS. 1 and 2, the vehicle is provided with the well-known rain sensor 35 connected to the body ECU 15.

The rain sensor 35 is disposed immediately behind the upper part of the front window 19 so that the rain sensor 35 is at a position different from the optical unit 20. Namely, the rain sensor 35 faces the inner surface (the rear surface) of the upper part of the front window 19.

The rain sensor 35 emits a light wave (an electromagnetic wave) forward. Then, as described above, the light wave emitted by the rain sensor 35 passes through the front window 19 and advances toward the outside of the front window 19. When the light wave is reflected by an obstacle located in front of the front window 19, this reflected light passes through the front window 19 and is received by the rain sensor 35. Then, the body ECU 15 determines whether or not this obstacle is "the specific obstacle" on the basis of the information on the intersection angle (the reflection angle) between the emitted light and the reflected light at this time. This specific obstacle includes moisture and an object other than moisture. In other words, the specific obstacle includes moisture and an object that is determined to be similar to moisture by the body ECU 15.

Next, the operation of the wiper control device 10 when the automatic wiper control mode is selected by the mode changeover switch 33 will be described.

First, the operation of the wiper control device 10 when the vehicle is running will be described. Namely, the operation of the wiper control device 10 when the ECU 15 does not determine that "the vehicle speed of the vehicle detected by the vehicle speed sensor 18 is 0 and the position of the shift lever detected by the shift lever position switch 17 is the P range or the N range" will be described.

In this case, when, for example, it rains in the area where the vehicle is located, the rain sensor 35 detects raindrops (the specific obstacle). Then, since the body ECU 15 determines that "the obstacle detected by the rain sensor 35 is the specific obstacle" and the body ECU 15 transmits the actuation signal to the actuator 32, the actuator 32 repeatedly rotates in the forward direction and the reverse direction at a constant interval. As a result, the sliding part 31 of each of the wipers 30A, 30B removes the foreign materials (such as raindrops) adhered to the sliding area Aa and the sliding area Ba of the front window 19.

For example, when the rain sensor 35 has finished the detection of raindrops (the specific obstacle) due to stoppage of rain, the body ECU 15 stops sending the actuation signal to the actuator 32. Then, since the actuator 32 is stopped, the wipers 30A and 30B do not swing.

Next, the operation of the wiper control device 10 when the vehicle is stopping will be described. Namely, the operation of the wiper control device 10 when the ECU 15 determines that "the vehicle speed of the vehicle detected by the vehicle speed sensor 18 is 0 and the position of the shift lever detected by the shift lever position switch 17 is the P range or the N range" will be described.

When the vehicle is stopping, the operation of the actuator 32 differs depending on whether or not the masking determination ECU 40 determines that "an opaque masking object is adhered to the camera anterior area Fa" on the basis of the imaging data transmitted from the camera 21. In other words, the control mode of the actuator 32 by the body ECU 15 is determined depending on whether the signal transmitted from the masking determination ECU 40 to the body ECU 15 is the detection signal or the non-detection signal. Therefore, hereinafter, the operation of the actuator 32 will be described for each of a case where the masking determination ECU 40 determines that a masking object is adhered to the camera anterior area Fa or a case where the masking determination ECU 40 determines that no masking object is adhered to the camera anterior area Fa.

Firstly, the case where the masking determination ECU 40 determines that "an opaque masking object is adhered to the camera anterior area Fa" based on the imaging data of the camera 21 (the case where the masking determination ECU 40 outputs the detection signal) will be described. In other words, firstly the case where the warning indication is displayed on the display 36 will be described.

By the way, when rain falls in the area where the vehicle is located in this case, the rain sensor 35 detects raindrops. Namely, the body ECU 15 determines that "the obstacle detected by the rain sensor 35 is the specific obstacle". Additionally, when rain does not fall and the occupant removes the masking object by his/her hand and/or the cleaning tool, the body ECU 15 may determine that "the obstacle detected by the rain sensor 35 (the hand and/or the cleaning tool positioned just before the rain sensor 35) is the specific obstacle" as described above.

However, even when the body ECU 15 determines that "the obstacle detected by the rain sensor 35 is the specific obstacle", the automatic wiper control by the body ECU 15 may be prohibited. Namely, when the body ECU 15 determines so and the masking determination ECU 40 determines that "an opaque masking object is adhered to the camera anterior area Fa", the automatic wiper control by the body ECU 15 is prohibited. In other words, since the body ECU 15 does not transmit the actuation signal to the actuator 32, the wipers 30A, 30B do not swing.

Thus, the occupant of the vehicle, who saw the warning indication displayed on the display 36, gets out of the vehicle and can remove the masking object adhered to the camera anterior area Fa of the front window 19 with using, for example, the cleaning tool gripped by his/her hand. The wipers 30A, 30B do not swing at this time. Thus, even when the hand of the occupant and/or the cleaning tool are located just in front of the sliding area Aa and the sliding area Ba, the occupant does not have difficulty in removing the masking object due to the swinging movement of the wipers 30A, 30B.

Next, the case where the masking determination ECU 40 determines that "no opaque masking object is adhered to the camera anterior area Fa" based on the imaging data of the camera 21 (the case where the masking determination ECU 40 outputs the non-detection signal) will be described. In other words, the case where the warning indication is not displayed on the display 36 will be described. Noted that when the masking determination ECU 40 determines that "no opaque masking object is adhered to the camera anterior area Fa", the time when the masking determination ECU 40 sends the non-detection signal to the body ECU 15 may be referred to as "masking object non-detection time" in the following explanation. It should be noted that the masking determination ECU 40 repeatedly determines the presence or absence of the masking object at each first predetermined time described below. Therefore, if no masking object continues to be adhered to the camera anterior area Fa for a certain period of time, "the masking object non-detection time" appears multiple times within this period. Therefore, each masking object non-detection time in the following description may be referred to as "first masking object non-detection time" and "second masking object non-detection time" in the order of appearance.

Figure 3:
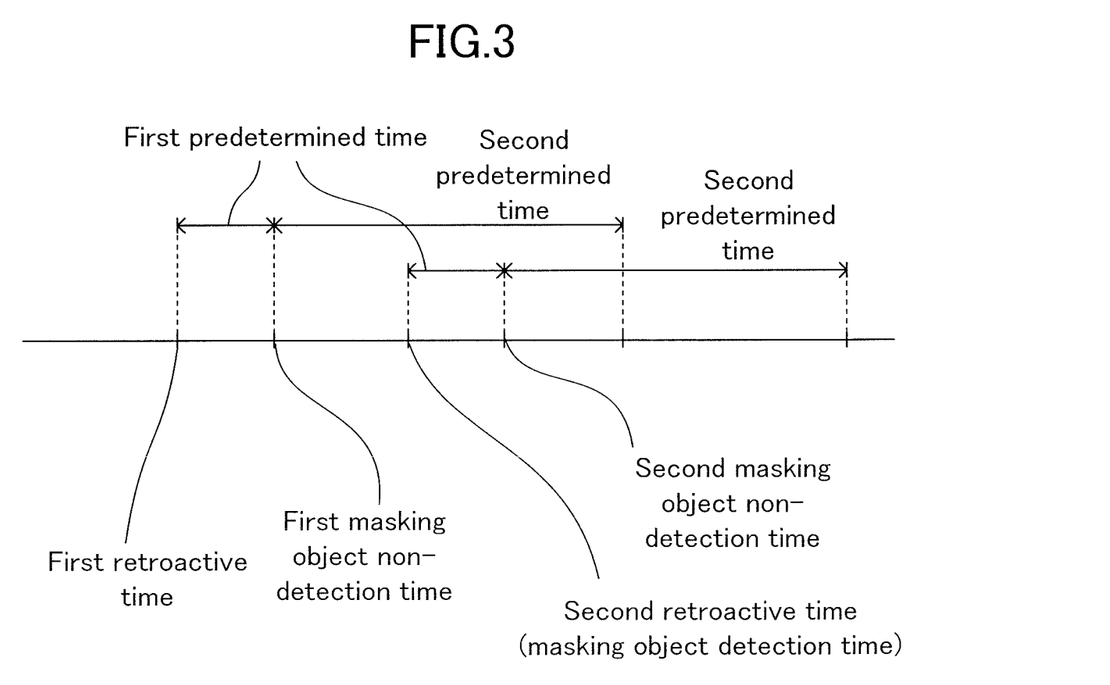
FIG. 3 is a timing chart for explaining processing executed by the vehicle wiper control device according to the embodiment of the present invention.

For example, when the masking determination ECU 40 sends the non-detection signal to the body ECU 15 at the first masking object non-detection time shown in FIG. 3, the operation of the actuator 32 differs depending on the type of the signal outputted by the masking determination ECU 40 at the first retroactive time that goes back in time by a first predetermined time (for example, one second) from the first masking object non-detection time. Namely, the operation of the actuator 32 when the masking determination ECU 40 outputs the detection signal at the first retroactive time differs from the operation of the actuator 32 when the masking determination ECU 40 outputs the non-detection signal at the first retroactive time. Therefore, hereinafter, the operation of the actuator 32 will be described for each of a case where the masking determination ECU 40 outputs the detection signal and a case where the masking determination ECU 40 outputs the non-detection signal.

First, the case where the masking determination ECU 40 outputs the detection signal at the first retroactive time and outputs the non-detection signal at the first masking object non-detection time will be described.

In this case, it can be assumed that the masking object was removed from the camera anterior area Fa between the first retroactive time and the first masking object non-detection time. However, since the time interval between the first retroactive time and the first masking object non-detection time is short, the hand of the occupant and/or the cleaning tool is highly likely to be positioned just before the sliding area Aa and the sliding area Ba at the first masking object non-detection time. Therefore, it is not preferable to swing the wipers 30A and 30B at the first masking object non-detection time. Therefore, in this case, until the second predetermined time (for example, 10 seconds. This second predetermined time corresponds to the "predetermined period of time" of the claims) has elapsed from the first masking object non-detection time, the automatic wiper control by the body ECU 15 is prohibited. Namely, even when determining that "the obstacle detected by the rain sensor 35 is the specific obstacle", the body ECU 15 does not transmit the actuation signal to the actuator 32. When the second predetermined time has elapsed from the first masking object non-detection time, the body ECU 15 transmits the actuation signal to the actuator 32.

The occupant, who removed the masking object from the camera anterior area Fa at the first masking object non-detection time, is highly likely to move his/her hand and/or the cleaning to a position away from the sliding area Aa and the sliding area Ba before the second predetermined time has elapsed from the first masking object non-detection time. Therefore, even if the wipers 30A and 30B are swung when the second predetermined time has elapsed from the first masking object non-detection time, the occupant, who has removed the masking object, is unlikely to have difficulty.

As shown in FIG. 3, in the case where the masking determination ECU 40 outputs the detection signal again at a masking object detection time between the first masking object non-detection time and the elapsed-time when the second predetermined time has elapsed from the first masking object non-detection time, the body ECU 15 executes a control different from the above control. Namely, when the ECU 40 outputs the detection signal at the elapsed-time, the body ECU 15 is prohibited from executing the automatic wiper control after the second predetermined time has elapsed.

Further, the case where the masking determination ECU 40 outputs the non-detection signal at the second masking object non-detection time that is the time when the first predetermined time has elapsed from this masking object detection time will be described. Namely, the case where the masking object detected at this masking object detection time is removed from the camera anterior area Fa before the second masking object non-detection time will be described. Noted that, in this case, this masking object detection time that goes back in time by the first predetermined time from the second masking object non-detection time is "second retroactive time".

In this case, the body ECU 15 does not transmit the actuation signal to the actuator 32 until the second predetermined time has elapsed from the second masking object non-detection time. Namely, in this case, when the second predetermined time has elapsed from the second masking object non-detection time, which is the time when the masking determination ECU 40 detects that a new masking object detected at the masking object detection time (the second retroactive time) is removed, the body ECU 15 transmits the actuation signal to the actuator 32.

Next, the case where the masking determination ECU 40 outputs the non-detection signal at each retroactive time (for example, the first retroactive time and the second retroactive time) that goes back in time by the first predetermined time from each masking object non-detection time will be described. In other words, the case where, for example, it can be assumed that no masking object has been adhered to the camera anterior area Fa for the period of time between the first retroactive time and the first masking object non-detection time will be described. Namely, the case where no masking object has been adhered to the camera anterior area Fa continuously will be described.

In this case, the hand of the occupant and/or the cleaning tool is highly unlikely to be located just before the sliding area Aa and the sliding area Ba at the first masking object non-detection time. Therefore, when the masking determination ECU 40 outputs the non-detection signal at the first masking object non-detection time, the body ECU 15 transmits the actuation signal to the actuator 32. Namely, the body ECU 15 immediately swings the wipers 30A and 30B at the first masking object non-detection time.

Next, a specific processing performed by the body ECU 15 will be described with using the flowcharts of FIGS. 4 and 5.

Figure 4:
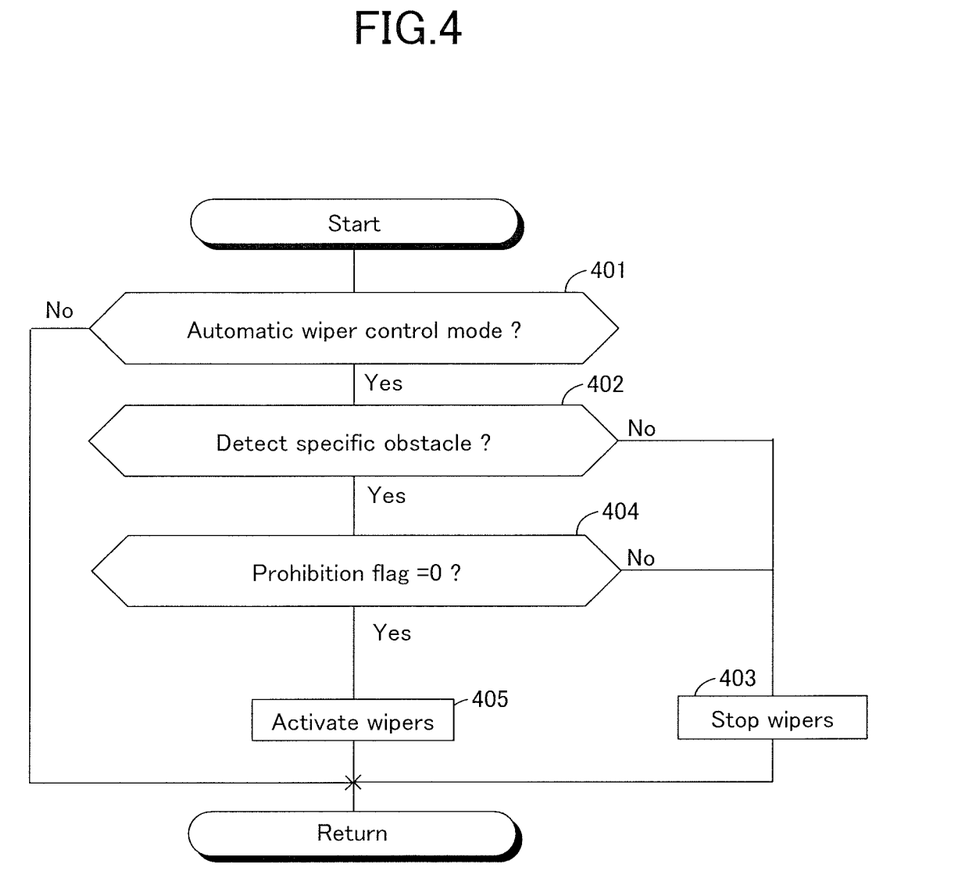
FIG. 4 is a flowchart indicating an automatic wiper executing processing executed by the vehicle wiper control device according to the embodiment of the present invention.

When an ignition SW of the vehicle is switched from OFF to ON by an operation of an ignition key (not shown), the body ECU 15 repeatedly executes the routine shown in the flowchart of FIG. 4 each time when the first predetermined time (for example, 1 second) has elapsed.

First of all, in step 401, the body ECU 15 determines whether or not the control mode selected by the mode changeover switch 33 is the automatic wiper control mode.

When determining No in step 401, the body ECU 15 temporarily ends the processing of this routine.

In this case, the manual control mode is selected by the mode change over switch 33. Therefore, when the wiper switch 34 is OFF, the body ECU 15 does not activate the actuator 32. On the other hand, when the wiper switch 34 is ON, the body ECU 15 repeatedly rotates the actuator 32 in the forward direction and the reverse direction at a constant interval.

On the other hand, when the body ECU 15 determines Yes in step 401, the body ECU 15 proceeds to step 402 to determine whether or not the rain sensor 35 is detecting the specific obstacle. When the body ECU 15 determines No in step 402, the body ECU 15 proceeds to step 403 not to transmit the actuation signal to the actuator 32. Therefore, the wipers 30A, 30B do not swing.

Upon completion of the processing of step 403, the body ECU 15 temporarily ends the processing of this routine.

On the other hand, when the body ECU 15 determines Yes in step 402, the body ECU 15 proceeds to step 404. When, for example, rain falls in the area where the vehicle is located, the body ECU 15 determines Yes in step 402.

In this case, the body ECU 15 determines whether or not the prohibition flag is "0". It should be noted that "0" is recorded on the backup RAM of the body ECU 15 as the initial value of this prohibition flag.

When the body ECU 15 determines Yes in step 404, the body ECU 15 proceeds to step 405 to repeatedly rotate the actuator 32 in the forward direction and the reverse direction at a constant interval. Therefore, the wipers 30A and 30B swing.

On the other hand, when the body ECU 15 determines No in step 404, the body ECU 15 proceeds to step 403. Namely, the body ECU 15 does not rotate the actuator 32.

Upon completion of the processing of step 403 or step 405, the body ECU 15 temporarily ends the processing of this routine.

Figure 5:
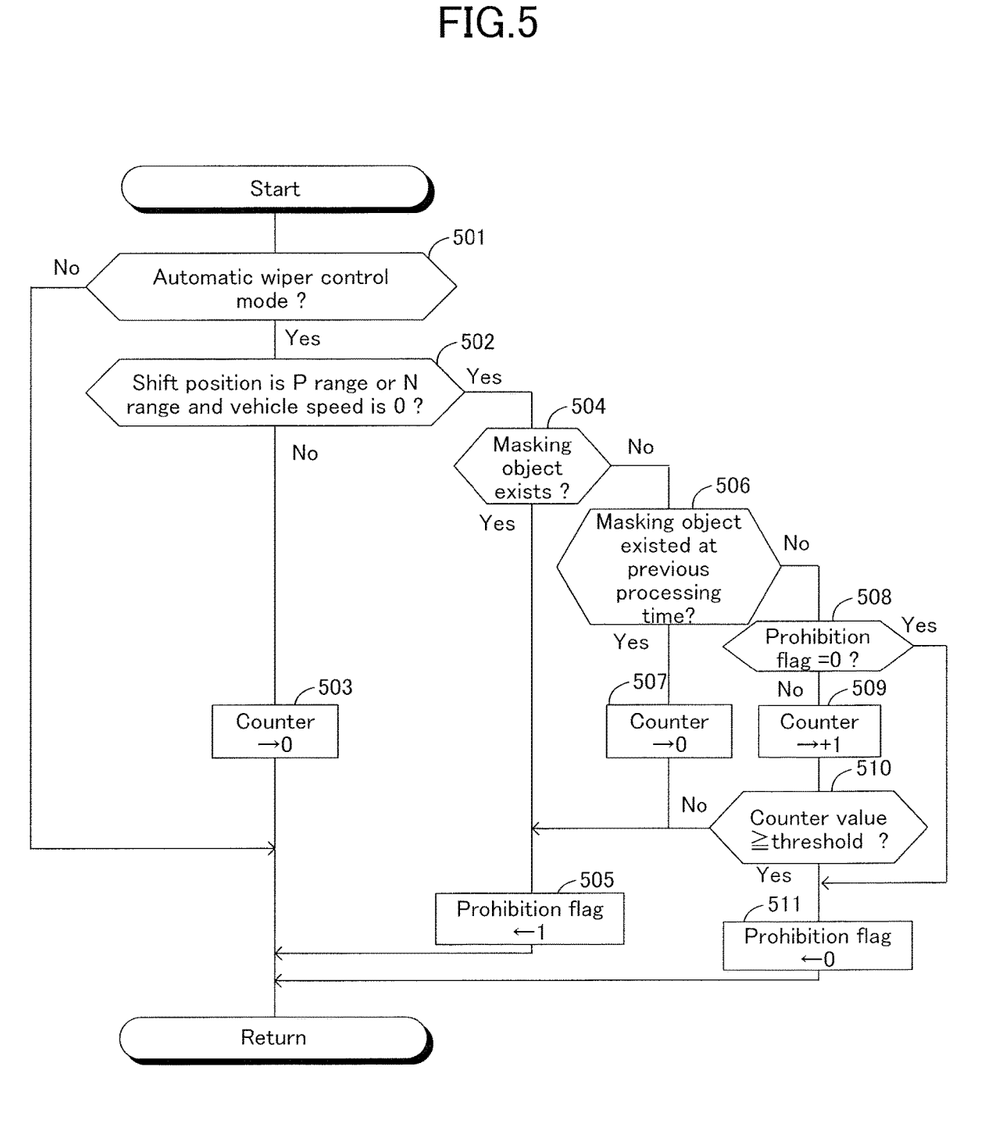
FIG. 5 is a flowchart indicating an automatic wiper prohibition determination processing executed by the vehicle wiper control device according to the embodiment of the present invention.

When the ignition SW of the vehicle is switched from OFF to ON by the operation of the ignition key (not shown), the body ECU 15 repeatedly executes the routine shown in the flowchart of FIG. 5 each time when the first predetermined time (for example, 1 second) has elapsed.

First, in step 501, the body ECU 15 determines whether or not the control mode selected by the mode changeover switch 33 is the automatic wiper control mode.

When determining No in step 501, the body ECU 15 temporarily ends the processing of this routine.

On the other hand, when the body ECU 15 determines Yes in step 501, the body ECU 15 proceeds to step 502. Then, in step 502, the body ECU 15 determines whether or not "the vehicle speed of the vehicle detected by the vehicle speed sensor 18 is 0 and the position of the shift lever detected by the shift lever position switch 17 is the P range or the N range". In other words, the body ECU 15 determines whether or not the vehicle is stopping.

When determining No in step 502, the body ECU 15 proceeds to step 503 to set the value of the counter to "0". Noted that "0" is recorded on the backup RAM of the body ECU 15 as the initial value of the counter.

Upon completion of the processing of step 503, the body ECU 15 temporarily ends the processing of this routine.

On the other hand, when determining Yes in step 502, the body ECU 15 proceeds to step 504.

The body ECU 15, which has proceeded to step 504, determines whether or not a masking object (eg, mud) is adhered to the camera anterior area Fa based on the type of the signal transmitted from the masking determination ECU 40.

When determining Yes in step 504, the body ECU 15 proceeds to step 505 to set the prohibition flag to "1". Therefore, when the body ECU 15 executes the routine shown in the flowchart of FIG. 4 after that, the body ECU 15 determines No in step 404. Therefore, the wipers 30A, 30B do not swing.

When the body ECU 15 determines Yes in step 504, the masking determination ECU 40 makes the display 36 show the warning indication.

Upon completion of the processing of step 505, the body ECU 15 temporarily ends the processing of this routine.

On the other hand, when determining No in step 504, the body ECU 15 proceeds to step 506 to determine whether or not the body ECU 15 determined Yes in step 504 at the time of the previous processing of this routine. In other words, the body ECU 15 determines whether or not the masking object was adhered to the camera anterior area Fa at the time going back in time from the current processing time of step 504 of this routine by the first predetermined time.

When determining Yes in step 506, the body ECU 15 proceeds to step 507 to set the value of the counter to "0".

Further, the body ECU 15, which has finished the processing of step 507, proceeds to step 505 to set the prohibition flag to "1".

Therefore, when the body ECU 15 executes the routine shown in the flowchart of FIG. 4 after that, the body ECU 15 determines No in step 404. Therefore, the wipers 30A, 30B do not swing.

On the other hand, when determining No in step 506, the body ECU 15 proceeds to step 508 to determine whether or not the prohibition flag is "0".

When determining Yes in step 508, the body ECU 15 proceeds to step 511 to set the prohibition flag to "0", and then temporarily ends the processing of this routine.

Noted that, when the body ECU 15 executes the routine shown in the flowchart of FIG. 4 after the processing of step 511, the body ECU 15 determines Yes in step 404. Therefore, the body ECU 15 swings the wipers 30A, 30B in step 405.

On the other hand, when determining No in step 508, the body ECU 15 proceeds to step 509 to add "1" to the value of the counter. When the body ECU 15 determined Yes in step 506 at the time of the previous processing of this routine and when the body ECU 15 determined No in step 510 at the time of the previous processing of this routine, the body ECU 15 determines No in step 508.

Subsequently, the body ECU 15 proceeds to step 510 to determine whether or not the value of the counter is equal to or greater than a predetermined threshold value. In the present embodiment, this threshold value is set to "10".

When the value of the counter is smaller than the threshold value, the body ECU 15 determines No in step 510 and then proceeds to step 505. In step 505, the body ECU 15 sets the prohibition flag to "1".

On the other hand, when the body ECU 15 determines No in step 508 consecutive times equal to or more than 10, after that the body ECU 15 determines Yes in the processing of step 510. Therefore, the body ECU 15 proceeds to step 511 to set the prohibition flag to "0" and temporarily ends the processing of this routine. It should be noted that the period of time, which elapses while the body ECU 15 executes the No determination processing consecutive times equal to or more than 10 in step 508, is "the second predetermined time".

When the body ECU 15 executes the routine shown in the flowchart of FIG. 4 after finishing the processing of step 511, the body ECU 15 determines Yes in step 404. Therefore, the body ECU 15 swings the wipers 30A, 30B in step 405.

It should be noted that the present invention is not limited to the above embodiment, and various modifications can be adopted within the scope of the present invention.

For example, the wipers 30A and 30B may be provided in a window part different from the front window 19 of the vehicle (for example, a window part provided in the rear of the vehicle), and the present invention may be applied to these wipers 30A and 30B.

The number of the wiper that slide on the surface of single window part does not need to be two. In other words, this number may be one or equal to more than three.

Figure 6:
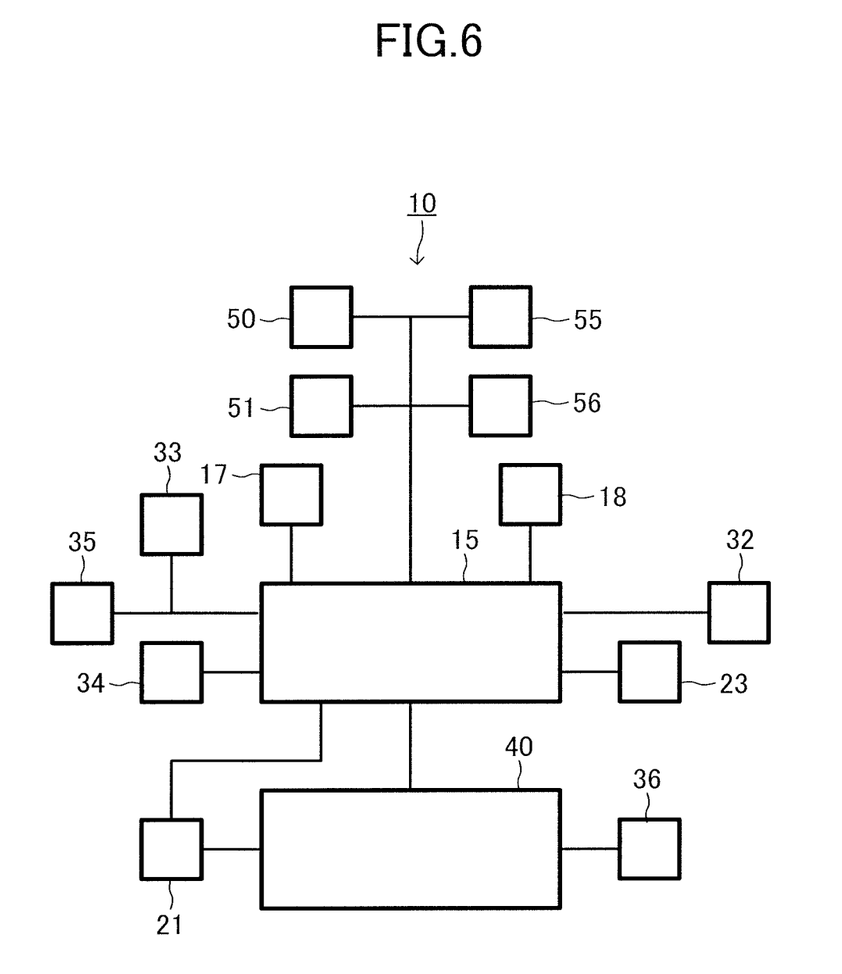
FIG. 6 is a control block diagram, which is similar to that of FIG. 2, according to a modified embodiment of the present invention.
Figure 7:
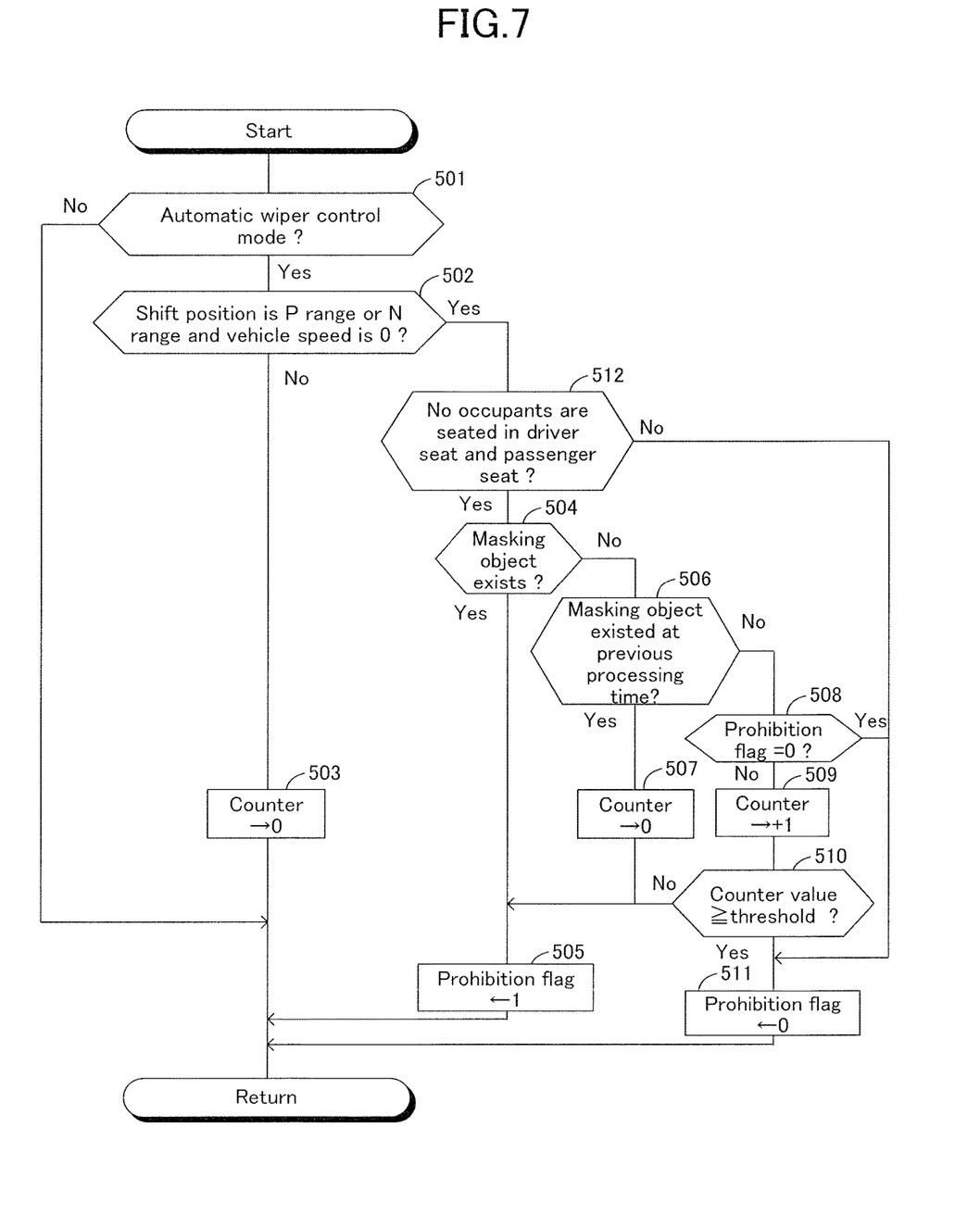
FIG. 7 is a flowchart, which is similar to that of FIG. 5, according to the modified embodiment of the present invention.

Further, the present invention may be carried out as a modified embodiment shown in FIGS. 6 and 7.

The wiper control device 10 of this modified embodiment is provided with a plurality of sensors for detecting whether or not an occupant is seated in each of a driver seat and a passenger seat of the vehicle, respectively. Namely, the wiper control device 10 is provided with a driver seat position sensor 50, a driver seat side seat belt sensor 51, a passenger seat position sensor 55 and a passenger seat side seat belt sensor 56, all of which are connected to the body ECU 15.

The driver seat position sensor 50 is built in the seat portion of the driver seat. When an occupant is seated in the seat portion of the driver seat, the driver seat position sensor 50 detects the load (weight) which the occupant gives to the seat portion. When the magnitude of the load detected by the driver seat position sensor 50 is equal to or larger than a predetermined value, the driver seat position sensor 50 outputs an ON signal to the body ECU 15. When the magnitude of the load detected by the driver seat position sensor 50 is smaller than the predetermined value, the driver seat position sensor 50 outputs an OFF signal to the body ECU 15.

A driver seat side seat belt locking means, which is located on the side of the driver seat and is not shown, is provided in the vehicle body. A locking metal of a driver seat side seat belt (not shown) can be detachably connected to the driver seat side seat belt locking means. When the locking metal is connected to the driver seat side seat belt locking means (in other words, when the driver seat side seat belt locking means is in a locked state), the driver seat side seat belt sensor 51 outputs an ON signal to the body ECU 15. When the locking metal is separated from the driver seat side seat belt locking means (in other words, when the driver seat side seat belt locking means is in a unlocked state), the driver seat side seat belt sensor 51 outputs an OFF signal to the body ECU 15.

When at least one of the driver seat position sensor 50 and the driver seat side seat belt sensor 51 is outputting the ON signal, the body ECU 15 determines that "an occupant is seated in the driver seat". On the other hand, when both the driver seat position sensor 50 and the driver seat side set belt sensor 51 are outputting the OFF signals, the body ECU 15 determines that "no occupant is seated in the driver seat".

The structure and function of the passenger seat position sensor 55 and the passenger seat side seat belt sensor 56 are the same as those of the driver seat position sensor 50 and the driver seat side seat belt sensor 51, respectively.

Namely, when at least one of the passenger seat position sensor 55 and the passenger seat side seat belt sensor 56 is outputting an ON signal, the body ECU 15 determines that "an occupant is seated in the passenger seat". On the other hand, when both the passenger seat position sensor 55 and the passenger seat side seat belt sensor 56 are outputting an OFF signals, the body ECU 15 determines that "no occupant is seated in the passenger seat".

The flowchart of the modified embodiment shown in FIG. 7 is the same as the flowchart of FIG. 5 except that step 512 is added between step 502 and step 504.

As shown in the flowchart of FIG. 7, the body ECU 15, which has determined Yes in step 502, proceeds to step 512 to determine whether or not no occupants are seated in both the driver seat and the passenger seat based on the signals received from the driver seat position sensor 50, the driver seat side seat belt sensor 51, the passenger seat position sensor 55 and the passenger seat side seat belt sensor 56.

When determining No in step 512 (namely, when an occupant is seated in at least one of the driver seat and the passenger seat), the body ECU 15 proceeds to step 511.

In this case, it can be assumed that an occupant is positioned inside the vehicle. In other words, it can be assumed that the occupant is highly unlikely to get out of the vehicle to remove the masking object on the front window 19.

Therefore, when the body ECU 15 executes the routine shown in the flowchart of FIG. 4 after that, the body ECU 15 determines Yes in step 404. Therefore, the body ECU 15 swings the wipers 30A, 30B in step 405.

On the other hand, when determining Yes in step 512, the body ECU 15 proceeds to step 504. In this case, it can be assumed that an occupant is positioned outside the vehicle. In other words, it can be assumed that an occupant is highly likely to get out of the vehicle to remove the masking object on the front window 19.

In the case, the processing after step 504 are the same as those of the flowchart in FIG. 5.

The flowchart of FIG. 7 may be modified such that the processing of step 512 is executed between step 504 and step 505. In this case, when determining Yes in step 512, the body ECU 15 proceeds to step 505. On the other hand, when determining No in step 512, the body ECU 15 proceeds to step 511.

Further, step 512 of the flowchart of FIG. 7 (and the above-described modified embodiment of FIG. 7) may be changed to a step in which the body ECU 15 determines "whether or not no occupant is seated in at least one of the driver seat and the passenger seat".

When the body ECU 15 determines that occupants are seated in both the driver seat and the passenger seat (when determining No in step 512), it can be assumed that the occupants are highly unlikely to get out of the vehicle to remove the masking object on the front window 19. Therefore, when determining No in step 512, the body ECU 15 proceeds to step 511.

On the other hand, when the body ECU 15 determines that no occupant is seated in at least one of the driver seat and the passenger seat (when the body ECU 15 determines Yes in step 512. For example, when an occupant is seated in the passenger seat and no occupant is seated in the driver seat), it can be assumed that an occupant is highly likely to get out of the vehicle to remove the masking object on the front window 19. Therefore, when determining Yes in step 512, the body ECU 15 proceeds to step 504 (or step 505).

The vehicle to which the present invention is applied may be a manual transmission vehicle (MT automobile) having a manual transmission instead of an automatic transmission vehicle.

In this case, the body ECU 15 determines whether or not "the vehicle speed of the vehicle detected by the vehicle speed sensor 18 is 0 and the position of the shift lever is the neutral position" in step 502.

The body ECU 15 may determine whether or not the vehicle is stopping based only on one of the gear stage of the transmission and the vehicle speed.

What is claimed is:

1. A vehicle wiper control device comprising:
an actuator for generating a driving force to move a wiper capable of reciprocating while in contact with an outer surface of a window part that is made of a translucent material and a part of a vehicle;
a rain sensor, provided so as to face an inner surface of the window part, for emitting a light wave so as to make the light wave pass through the window part and detecting a raindrop by receiving a reflected light wave of the emitted light due to the raindrop located outside the window part;
a camera provided so as to face the inner surface of the window part and receive photographing light flux passing through a camera anterior area located on the outer surface of the window part and outside a sliding area of the wiper, and obtain imaging data based on the received photographing light flux; and
a control unit configured to:
execute automatic wiper control that automatically activates the actuator when the raindrop is detected by the rain sensor;
determine whether a masking object is adhered to the camera anterior area outside the sliding area of the wiper based on the imaging data transmitted from the camera, which is a masking object sensor separated from the rain sensor; and
prohibit execution of the automatic wiper control when the masking object is determined to be adhered to the camera anterior area and when the vehicle stops running, wherein
the vehicle stops running when the vehicle is not moving or the vehicle speed is zero, and
the execution of the automatic wiper control is prohibited for a predetermined period of time from a changing time, the changing time being a time at which the masking object, which has been determined to be adhered to the camera anterior area, is then determined to not be adhered to the camera anterior area.

2. The vehicle wiper control device according to claim 1, further comprising:
an occupant detection sensor for detecting whether or not an occupant is seated in each of a driver seat and a passenger seat of the vehicle,
wherein the control unit is further configured to prohibit the execution of the automatic wiper control only when the occupant detection sensor detects that no occupant is seated in at least one of the driver seat and the passenger seat of the vehicle.

3. The vehicle wiper control device according to claim 1, further comprising:
an occupant detection sensor for detecting whether or not an occupant is seated in each of a driver seat and a passenger seat of the vehicle,
wherein the control unit is further configured to prohibit the execution of the automatic wiper control only when the occupant detection sensor detects that no occupants are seated in both the driver seat and the passenger seat of the vehicle.

* * * * *